INVENTORS
Ruediger W. Knodt
Charles R. Schrankel

ATTORNEY

United States Patent Office 3,336,857
Patented Aug. 22, 1967

3,336,857
INVERTIBLE DRIP COFFEE MAKER
Ruediger W. Knodt and Charles R. Schrankel, Corning, N.Y., assignors to Corning Glass Works, Corning, N.Y., a corporation of New York
Filed May 27, 1965, Ser. No. 459,186
4 Claims. (Cl. 99—296)

ABSTRACT OF THE DISCLOSURE

A double-bowl drip coffee maker construction having one vessel positioned upon another in open communication with each other wherein water is heated in one vessel, the coffee maker is then inverted as a unit, and the heated water is permitted to flow downwardly through a vented two-part basket assembly containing ground coffee and into the lower vessel as brewed coffee.

---

In the past, it has been customary to brew drip coffee by heating water in a separate vessel and then pouring such heated water into an open topped container, retaining ground coffee adjacent its lower end. The heated water is then allowed to drip through the ground coffee and into a receiving vessel therebelow. The upper container, being open at its top, is of course vented directly to the atmosphere so that the water may freely flow downwardly through the ground coffee.

Recent improvements in drip coffee makers have included the concept of heating the water in a lower vessel, which usually receives the brewed coffee, and pouring the heated water into the upper vessel. The upper vessel is then quickly placed upon the now empty lower vessel which receives the brewed coffee as it drips downwardly through the ground coffee retained by the upper vessel. This procedure requires complex and somewhat inconvenient manipulation of the various components in order to fill the upper container and replace it on the lower container before the water seeps through the coffee retained thereby and begins to drip outwardly therefrom.

The present invention provides a novel structure which eliminates the rather cumbersome manipulation required with the prior art devices and provides a two-bowl structure which permits the heating of water in one bowl, the manipulation of the bowls as a unit to an inverted position so that the heated water may flow downwardly through ground coffee into a lower brew-receiving and serving vessel. In essence, the coffee maker includes an upwardly-open lower cylindrical bowl portion for receiving brewed coffee, a downwardly-open upper cylindrical bowl portion positioned upon the lower bowl portion for heating water when in an inverted position, and a basket assembly removably secured to the upper bowl portion and projecting downwardly into the lower bowl portion for retaining ground coffee and for venting the closed upper bowl portion.

It has been an object of the invention to provide a novel drip coffee maker structure which not only functions to brew drip coffee, but which also will heat the water utilized to brew the coffee.

A further object of the invention has been to provide an interfitting two-bowl drip coffee maker structure which may be inverted and manipulated as a unitary structure so that water may be heated in one bowl and the structure inverted so as to allow the water to flow downwardly through ground coffee retained adjacent the connection between such bowls and drip into the lower bowl as brewed coffee.

An additional object of the invention has been to provide a closed-ended invertible drip coffee maker having upper and lower bowl portions which may be manipulated as a unit, wherein the lower bowl portion is provided with a pair of opposed pouring lips at approximately right angles to a manipulating handle, and such pouring lips communicate with a vent tube extending into an upper region of the upper bowl portion so as to vent such bowl and facilitate the downward flow of liquid therefrom.

These and other objects of the invention will become apparent to those skilled in the art from the following disclosure and accompanying drawings in which.

Figure 1:
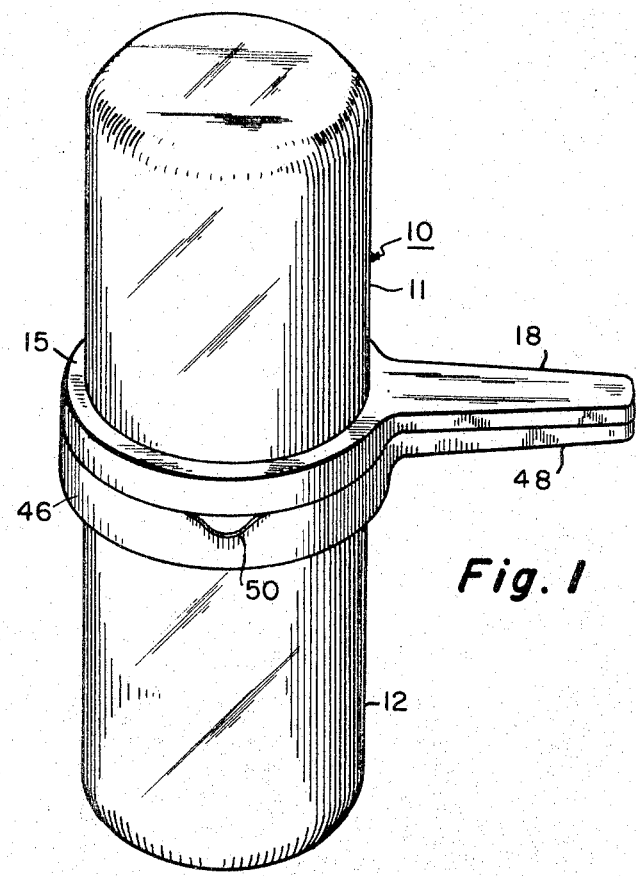
FIGURE 1 is a perspective view of a coffee maker embodying the invention.

Referring now to the drawings, a coffee maker 10 is shown comprising a heating vessel or water-retaining assembly 11, a brew-receiving or serving vessel assembly 12, and a basket assembly 13.

The heating vessel assembly 11 comprises an open mouth bowl portion 14, preferably of glass, and a collar ring 15 having a well 16 for receiving the rim 17 of the open mouth portion of the bowl 14. A suitable adhesive is supplied to the well 16 to securely adhere and attach the ring 15 to the rim 17. An integral handle 18 projects outwardly from the collar ring 15, and has an alignment recess 19 formed in a substantially flat surface thereof. The collar ring 15 is provided with an outwardly projecting cylindrical rim 20 concentric with the inner periphery of the collar ring 15. The inner periphery of the cylindrical rim is provided with a plurality of equally spaced recesses 21 for a bayonet connection.

The basket assembly 13 comprises a spreader plate assembly 25 and a basket member 26. The spreader plate assembly includes a perforated spreader plate 27 having a plurality of openings 28, and a depending flange portion 29 terminating in a radially-outwardly expanded skirt portion 30. The flange portion 29 is provided with a plurality of equally spaced bosses or bayonet lugs 31 which cooperably engage and lock into the recessed portions 21 of the cylindrical rim 20. The radially outwardly offset skirt portion 30 forms a stop abutment portion 32 which cooperates with the outer surface of the cylindrical rim 20 to provide a stop for the bayonet lock mechanism, and limits the insertion of the spreader plate assembly 25 within the cylindrical rim 20. If desired, a suitable sealing gasket may be positioned between the stop abutment portion 32 and the outer surface of cylindrical rim 20 to prevent water within bowl portion 14 from bypassing the basket assembly 13.

A central opening 33 is formed through the spreader plate 25 and has a longitudinally-extending tube or stem 34 fixedly positioned therewithin and extending therethrough. The tube 34 extends upwardly within the upper region of bowl portion 14, when in an inverted position, so as to be above the surface of water retained within the inverted bowl when it is filled to the brewing capacity of the coffee maker. The lower end of the tube 34 extends a short distance below the spreader plate 27 and has a tapered nose or end 35, for purposes which will become more apparent hereinafter.

The basket member 26 has a perforated bottom portion 36 provided with a plurality of openings 37, and a sidewall portion 38 provided at its upper end with a roll bead 39. The sidewall portion 38 has a plurality of outwardly projecting inclined lugs or discontinuous thread portions 40 which cooperate with inwardly protruding bosses 41 formed on the flange portion 29 of the spreader assembly 25 to lock the basket member 26 in position on the spreader plate assembly with the roll bead portion 39 against the under surface of the spreader plate 27. The bottom portion 36 of the basket 26 has an opening 42 provided with a tube 43 projecting upwardly within the basket member 26. The upper end of the tube 43 has a roll bead 44 which cooperably receives the tapered nose 35 of the tube 34 when the basket is locked in position on the spreader plate assembly 25.

The brew-receiving and serving vessel assembly 12 comprises an open mouth bowl portion 45, preferably of glass, having an handle attachment ring 46 secured to the upper rim of the open mouth portion by a suitable adhesive. The handle attachment ring 46 is provided with an integral handle 48 projecting radially outwardly therefrom. The handle 48 has an alignment button 49 projecting from a substantially flat face thereof, which is cooperably positionable within the alignment recess 19 of handle 18 to maintain the handles in alignment and form an integral handle assembly of the entire coffee maker 10.

The internal diameter of the handle attachment ring 46 is of such magnitude to cooperably receive the cylindrical rim 20 therewithin, so that the flat surfaces of the handles 18 and 48 and continuous flat surface portions of their respective attachment collar rings 15 and 46, are in cooperative substantially planar engagement. The handle attachment ring 46 is provided with a pair of opposed pouring lips 50 which are at substantially right angles to the handle 48, so as to facilitate both left and right handed pouring from the serving vessel 12. In addition, the lips 50 extend into the attachment ring 46 a distance greater than the cylindrical length of the cylindrical rim 20, so as to provide an air passage or ventilation within the coffee maker for reasons to be described hereinafter.

In operation, the heating vessel or water-retaining bowl assembly 11 is filled with water to a prescribed level for the desired amount of coffee to be brewed. A premeasured amount of coffee is then placed within the basket member 26, again corresponding to the desired amount of coffee to be brewed. If the desired amount is equal to the maximum brewing capacity of the coffee maker, the basket member 26 may be used as a scoop and filled with ground coffee to the top of the tube 43, with excess coffee falling back into the supply through the center of tube 43.

The filled basket member 26 is then securely attached to the spreader plate assembly 25 by means of the inclined lugs 40 and inwardly protruding bosses 41 which tighten the roll bead 39 against the undersurface of the spreader plate 27. The assembled basket assembly is then inverted and positioned downwardly within the upwardly opened heating vessel 11, which is now filled to a desired level with water. The bosses or lugs 31 formed on the flange 29 of the spreader plate assembly are cooperably received within the recesses 21 formed in the cylindrical rim 20 to lockably retain the basket assembly 13 within the water-retaining bowl assembly 11. The brew-receiving and serving vessel assembly 12 is then inverted and placed upon the heating vessel assembly 11 with the handles 18 and 48 in alignment by means of cooperating recess 19 and button 49, and with the cylindrical rim 21 positioned downwardly within the handle attachment ring 46.

The coffee maker, so assembled, is then positioned upon a burner and heated until the water is brought up to the boiling point. The entire unit is then inverted and rotated through an arc of 180° so that the serving vessel assembly 12 is on the bottom, and the water-retaining bowl assembly 11 is on the top. The coffee maker 10 is inverted as a unit in its assembled state by means of the composite handle formed by aligned handles 18 and 48. The unit, so-inverted, is removed from the heat and the water in the water-retaining bowl assembly 11 is allowed to flow downwardly through the coffee-retaining basket assembly 13, extracting the essence therefrom, and drip into the brew-receiving and serving vessel 12 as brewed coffee.

It should be noted, that when the coffee maker is at its full brewing capacity, the water level within the inverted water-retaining bowl assembly 11 will be below the top of the tube or stem 34 projecting upwardly therewithin. The tube 34 communicates with tube 43 which, as shown in the drawing, is opened to the serving vessel assembly 12 having the previously described venting pouring lips 50. As a result, an air passage extends from the atmosphere surrounding the coffee maker through the pouring lips into vessel 12 and upwardly through tubes 43 and 34 so as to prevent the formation of a vacuum within water-retaining bowl assembly 11. Accordingly, the heated water is allowed to freely flow downwardly through holes 28 and spreader plate 27, seeping through the ground coffee within the basket 26 so as to steep and extract the essence therefrom, and drip outwardly through the holes 37 formed in the bottom portion 36 of the basket 26 as brewed coffee downwardly into the brew-receiving and serving vessel 12.

When in the water-heating position, the steam generated through the boiling of the water escapes upwardly through the coffee grounds and the basket assembly, and outwardly through the pouring lips formed in serving vessel 12. This not only functions to preheat the vessel 12, but also a portion of steam condenses on the coffee grounds within the basket, thus moistening the grounds and starting the extraction of the essence therefrom so that when the unit is inverted, the rate of steeping or dripping is enhanced, thus facilitating a fast-flow drip coffee maker.

Figure 3:
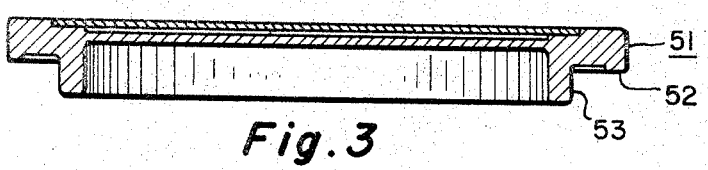
FIGURE 3 is a side elevational view, partially in section, of a cover member positionable upon the lower serving vessel assembly of the coffee maker shown in the drawing, when the upper water-heating vessel assembly is removed.
Figure 2:
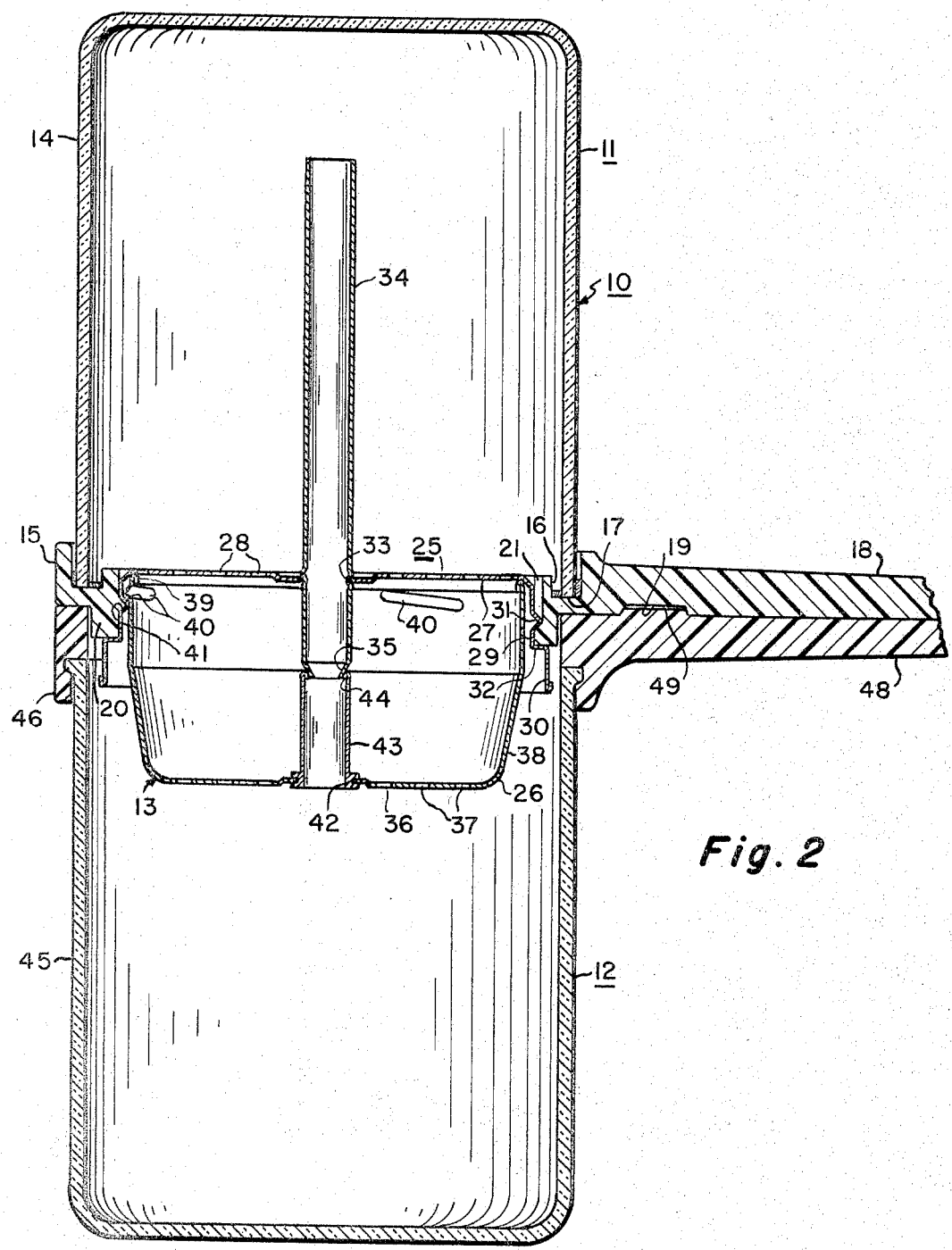
FIGURE 2 is a side elevational view in section of the coffee maker shown in FIGURE 1.

When the coffee maker is in the position as shown in FIGURES 1 and 2, the cylindrical rim 20 extends downwardly within the attachment ring 46, and below the upper surface thereof, so that if any leakage should occur past the basket, it will fall downwardly within the receiving vessel 12 and not seep out between the rings 15 and 46. When the brewing process is completed and the liquid from vessel 11 has completely flown or dripped through into vessel 12, the upper water-retaining bowl assembly 11, having the basket assembly secured thereto, is removed from the serving vessel assembly 12. A suitable cover or lid 51, shown in FIGURE 3, is positioned on the serving vessel assembly 12. An annular flange portion 52 of the cover 51 rests upon the upper surface of the handle attachment ring 46, and a downwardly extending flange 53 is cooperably received within the ring 46 so as to not only position to cover thereon, but also provide ventilation within the vessel 12 while facilitating controlled pouring therefrom.

Figure 4:
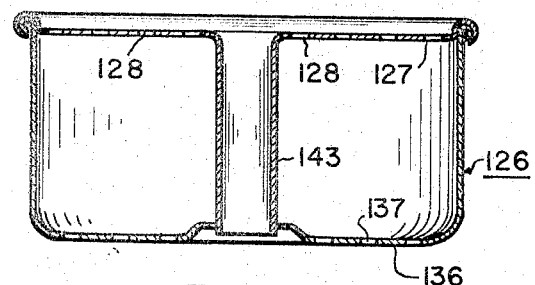
FIGURE 4 is a side elevational view in section of a pre-packaged cartridge of ground coffee which may be utilized with the present invention.

If desired, and as a modified embodiment of the present invention, the basket member 26 may be in the form of a prepackaged cartridge, having a predetermined amount of ground coffee packaged therein as a precharged unit. Such a cartridge is illustrated in FIGURE 4 and includes a cartridge container 126 provided with a spreader plate 127 having openings 128 therewithin. The cartridge 126 has a bottom portion 136 provided with a plurality of openings 137. The openings 128 and 137 are provided with a suitable covering necessary for packaging and shipping, which is easily removed by the consumer before insertion into the coffee maker.

A tube 143 extends upwardly within the cartridge 126 between the spreader plate 127 and the bottom portion 136, and cooperatively receives the nose portion 35 of the tube 34 when the cartridge is inserted within the spreader plate assembly 25. The cartridge 126 is provided with suitable connecting portions to lock into the spreader plate assembly 25. The operation of the coffee maker with the cartridge 126 is identical with that when utilizing the basket member 26, however, after the brewing operation is completed, the cartridge 126 may be removed from the spreader plate assembly 25 and discarded.

Although we have disclosed the now preferred embodiments of our invention it will be apparent to those skilled in the art that various changes and modifications may be made hereto without departing from the spirit and the scope of the invention as defined in the appended claims.

We claim:

1. An improved drip coffee maker for both heating water and brewing coffee in a composite coffee maker assembly which comprises, an upwardly-open serving vessel, a downwardly-open water-heating vessel positioned upon said serving vessel, interfitting collar ring means formed on said heating vessel and said serving vessel, aligned handle means projecting outwardly from said collar ring means, a basket assembly for retaining ground coffee removably secured to the collar ring means on said heating vessel and projecting within said serving vessel, pouring lip means formed in the collar ring on said serving vessel; said basket assembly comprising a spreader plate removably secured to said collar ring means formed on said heating vessel, and a basket member removably secured to said spreader plate; a vent tube fixedly positioned within and extending through said spreader plate for venting said heating vessel, and a separate tube fixedly retained by and projecting through the bottom of said basket member in axial alignment and cooperative engagement with said vent tube to provide an extension thereof for venting communication between said upper heating vessel and said lower serving vessel so as to facilitate the flow of water from said heating vessel and through the ground coffee within said basket.

2. An improved drip coffee maker as defined in claim 1 wherein said tube fixedly retained by said basket member extends to a height intermediate the top and bottom of said basket equivalent to the height of ground coffee required to brew the maximum capacity of the coffee maker, so that the tube provides an overflow for excess ground coffee when filling the basket from a source thereof.

3. An improved drip coffee maker as defined in claim 1 wherein said aligned handle means includes a pair of overlying radially extending handle portions, and interfitting button and recess means formed on the mating surfaces of said handle portions to align such portions as a composite handle assembly for inverting the coffee maker and allowing heated water in the heating vessel to drip through the ground coffee retained in the basket assembly and into the serving vessel.

4. An improved drip coffee maker as defined in claim 3 wherein said pouring lip means comprises a pair of opposed pouring lips positioned at substantially right angles to the longitudinal extent of said handle portion, and said pouring lips being in communication with said vent tube so as to vent the region above the water level in said heating vessel to the atmosphere.

References Cited

UNITED STATES PATENTS

| 1,083,900 | 1/1914 | Brown | 99—295 |
| 2,233,528 | 3/1941 | Heaton | 99—296 X |
| 2,245,182 | 6/1941 | Cameron | 99—296 |
| 2,263,881 | 11/1941 | Kors | 99—296 |

FOREIGN PATENTS

| 822,044 | 9/1937 | France. |
| 759,903 | 10/1956 | Great Britain. |

WALTER A. SCHEEL, *Primary Examiner.*

S. P. FISHER, *Assistant Examiner.*